July 27, 1965 F. H. BOWERS 3,197,391

METHOD OF ETCHING ALUMINUM

Filed June 18, 1964

Inventor.
Fredrick H. Bowers.
By W. F. Kellogg. Atty.

United States Patent Office 3,197,391

Patented July 27, 1965

3,197,391

METHOD OF ETCHING ALUMINUM

Fredrick H. Bowers, 610 Willard St., Kalamazoo, Mich.

Filed June 18, 1964, Ser. No. 376,069
3 Claims. (Cl. 204—33)

This invention relates to a method of decorating or similarly treating the surfaces of aluminum or aluminum alloys, more particularly, the etching of designs, intelligence, etc. on the surface of aluminum bodies or pieces.

It is well known that aluminum and aluminum alloy constituted bodies or pieces may be etched and thereby surface inscribed with various designs, figures, patterns, words and/or other characters; such is common practice. The conventional procedure for etching designs, etc. onto the surface of an aluminum or aluminum alloy body or piece is to place on the surface thereof an acid resist outlining the matter which is to be etched on the metal, thus showing the same as bare or raw aluminum surrounded by the resist. This procedure has a number of disadvantages, for example, the involved elements of labor and time expenditure are adverse to its economical feasibility, the lack of ability to apply the acid resist completely over the surface other than the to-be-etched design, the breaking away or removal of portions of the resist, even though small, from the coated surface, resulting in unwanted exposure to the etching acid, and more or less uncontrolled, or at least partly uncontrolled etching. My invention is based on the discovery of a method for etching the surfaces of aluminum or aluminum alloy pieces, wherein the procedural steps thereof are inverse to those heretofore practiced in and for the accomplishment of such product or work; are relatively inexpensive and simple, and capable of satisfcatory adaptation to successful mass production.

With the foregoing in mind, it may be stated that the principal object of the invention is to provide a method of etching, by means of which, clear, sharp and identical design patterns can be cheaply, simply, and rapidly effected on the surfaces of aluminum and/or aluminum bodies or pieces, fabricated or otherwise, and this by comparatively unskilled labor.

Stated briefly, the invention comprises the placement or transfer of a selected design or pattern, by silk screen, printing, photographic transfer, etc., on the surface of the alumiunm body or piece to be etched, the placement or transfer being effected with a suitable metal-etch resist material, such as an asphaltum base flowable composition, a photo-sensitive composition, or the like. Thereupon, the raw aluminum exposed portions of the piece are anodized and the piece then washed to remove the resist, leaving the resist coated portions non-anodized and exposed, following which the piece is immersed in an etching solution with the anodized surface of the piece acting as a resist to its being etched and only the non-anodized applied pattern being etched to produce the desired result.

Details of my invention are hereinafter described in connection with the figures of the accompanying drawings.

Figures 1, 2, 3, 4, 5, 6:
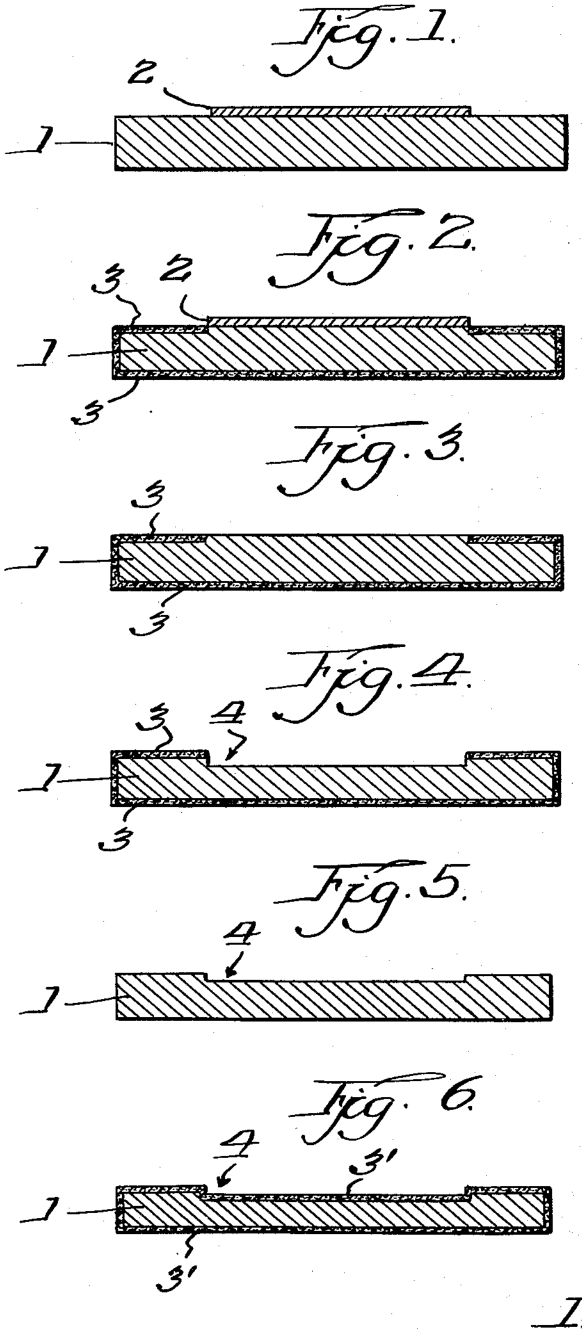
FIGURE 1 is an enlarged fragmentary section of an aluminum or aluminum alloy piece having a design or pattern applied or transferred thereto with an etching acid-resistant material, and prior to anodizing.
FIGURE 2 is a like view wherein the piece has been anodized, except for that portion having the acid-resistant design or pattern applied thereto.
FIGURE 3 is a similar view wherein the acid-resistant material has been removed with the balance of the surface of the piece anodized.
FIGURE 4 is a view like FIGURE 3, but wherein the anodized piece has been etched, the anodized surface having served as a resist, and the depth of the etching, as shown, being merely illustrative.
FIGURE 5 is a similar view in which the anodizing of the non-etched surface has been removed, leaving the area with a raw aluminum surface.
FIGURE 6 is a view similar to FIGURE 5, wherein the etched and raw aluminum surfaces of the piece have been reanodized.

The practicing of the invention, preferably begins with the buffing or polishing, or both, and the cleaning of the aluminum pieces 1 to be treated whereupon they are placed upon suitable racks (not shown) made of a material which is impervious to dips and other compounds and will not take on an oxide coating.

Thereupon, the racked pieces are immersed in an adequate cleansing solution, removed and drained, leaving the surfaces thereof in a clean and raw state.

Following the buffing-cleaning preparation of the pieces, the desired portions of their surfaces have patterns, which can comprise various designs, figures, words and/or other characters, applied or transferred thereonto by printing, silk screening, painting or photographic transfer, such transfer being effected, in instances of printing, silk screening or painting, with an acid-resistant material showing the image or matter to be etched, as indicated at 2, and in the instance of photographic transfer, by acid-resistantly photographing the same thereon, as shown in FIGURE 1. There are, of course, various resists which may be used in or for the printing, silk screening or painting transfer.

At this point, it is noted that this described step of transfer of matters to be etched in or with an acid-resistant material directly onto the aluminum pieces is opposite or contrary to the conventional form of etching, wherein the image or pattern to be etched is applied in the reverse of that which is desired.

The racked aluminum pieces are now anodized by immersing them in the usual sulphuric acid solution and concurrently inducing an electric current therethrough; the pieces becoming the anode, and the solution containing tank, the cathode, thus liberating oxygen at the anode which combines with the aluminum to form the oxide film or anodic coating over said pieces, except for those portions or surfaces having the resistant image or pattern transfer thereon, such coating being indicated by numeral 3, as shown in FIGURE 2 of the drawings. The time of this anodizing step may vary from 10 to approximately 20 minutes, or more, depending upon the desired thickness of the coating.

The anodized surfaces of the pieces serve as an effective etching acid resist as hereinbefore stated. Moreover, it is of importance to here note that because the anodized surfaces, as above described, are a hard oxide film integral with, and hence a part of the aluminum bodies or pieces, its ability to endure and so, to effectively control or confine the action of the etching acid to, and only to, the applied and to-be-etched design is by far a definite improvement over applied resists heretofore used in the art.

After removal of the resist (see FIGURE 2) the racked aluminum pieces, as shown in FIGURE 3, are immersed in an acid etching solution and permitted to remain therein for periods of time sufficient to effect or produce an etch of the desired depth, indicated at 4 in FIGURE 4. To produce etching of approximately .002 to .003 inch will require an immersion of from two to four minutes. The depth or severity of the etch and surface produced can, of course, be varied while leaving the anodized coating on the aluminum pieces substantially unaffected by varying the character of the acid etching solution.

A typical and satisfactory acid etching solution, I have found, may be proportionately made up to 11.5 gallons of muriatic acid of approximately 18° Baumé, also known as hydrochloric acid; 26 gallons of water; and 11 ounces of copper carbonate. It may be either cold or warm, though the use of a cold solution has been found to afford better etching control.

In and during the etching step of the method, certain insoluble elements are, or may be, captured in a somewhat viscous film on the surfaces of the aluminum pieces, producing that which appears to be a smut. To avoid this condition, it is desirable, though not necessary, that the acid etching solution be maintained in agitation during the etching, and preferably, applied to the pieces by splashing or similar application. Thereby, a cleaner and brighter product is effected.

Following etching of the pieces, they are subjected to a bath in a hot caustic soda solution which functions to remove the previously effected anodic coatings therefrom, leaving the former anodized acid-resistant surfaces thereof in raw or clear aluminum state, as illustrated in the FIGURE 5. This being accomplished, the pieces are reanodized in the usual sulphuric acid bath, as hereinbefore described. Thereby, the entire surface areas of the pieces are anodized, as indicated at 3', including those of the etched design or pattern, as shown in FIGURE 6 of the drawings.

If color is desired in or on the completed and over-all anodized aluminum pieces, a suitable dye solution is produced and the pieces are immersed therein for periods of time sufficient to take the dye. It may be noted at this point, that the outside coating on the piecings is quite sufficiently porous that it will absorb organic dyes of a desired hue. Whether colored or left plain, the eventual sheen or the aluminum is retained, if not enhanced.

By reason of an absolute reversal of the conventional method of anodizing aluminum as taught by my invention, to wit, applying the desired design, image or pattern to its surface with an acid resist, anodizing the remaining or exposed surfaces as a resist to the subsequent acid etching of the exposed and/or non-anodized surfaces, I am enabled to produce etched aluminum products of exceptional quality and sharpness of design in a far less time and at a far less cost; moreover, to use relathis connection, it will be understood that the essence of tively unskilled labor for the attainment thereof. In this connection, it will be understood that the essence of my invention resides in the use of an anodized surface on aluminum or aluminum alloy bodies or pieces as a resistant to acids used in the subsequent etching thereof, such being revolutionary in the art and affording great and material advantages and benefits.

It is to be, and will be understood, that it is intended to cover all changes and modifications of the herein described form of my invention, chosen for the purpose of illustration, which do not constitute departures from the spirit and scope thereof.

I claim:

1. A method of etching aluminum comprising:
(a) applying to a surface thereof a preselected pattern of resist of a kind inert and resistant to the effects of anodizing;
(b) anodizing the remainder of the surfaces;
(c) removing the resist and exposing the patterned non-anodized surface; and
(d) selectively etching the patterned non-anodized surface by the application of an etchant thereto with the anodized surfaces as a resist thereto and leaving said anodized surfaces substantially unaffected.

2. A method of etching aluminum, comprising:
(a) applying to a surface thereof a preselected pattern of resist of a kind inert and resistant to the effects of anodizing;
(b) anodizing the remainder of the surfaces;
(c) removing the resist and exposing the patterned non-anodized surface;
(d) selectively etching the patterned non-anodized surface by application of an etchant thereto with the anodized surfaces as a resist to the same and leaving said anodized surfaces substantially unaffected;
(e) removing the previously anodized surface coating; and
(f) reanodizing the entire surface, including the etched pattern.

3. A method of etching an aluminum piece, comprising:
(a) applying to the surfaces thereof a pre-selected pattern of etchant resist of a kind inert and resistant to the effects of anodizing;
(b) anodizing the remainder of said surfaces;
(c) removing the resist and exposing the patterned non-anodized surfaces;
(d) selectively etching the patterned non-anodized surfaces by the application of an etchant thereto consisting of a solution of hydrochloric acid and copper carbonate;
(e) removing the previously anodized coating; and
(f) re-anodizing the surfaces including those of the etched pattern.

References Cited by the Examiner

UNITED STATES PATENTS

| | | | |
|---|---|---|---|
| 2,691,627 | 10/54 | Johnson | 204—18 |
| 2,993,847 | 7/61 | Poch | 204—18 |
| 3,035,990 | 5/62 | Davis et al. | 204—33 |
| 3,037,896 | 6/62 | Gauntt et al. | 204—33 |
| 3,065,152 | 11/62 | Douglass et al. | 204—18 |
| 3,099,610 | 7/63 | Cybriwsky et al. | 204—33 |

JOHN H. MACK, *Primary Examiner.*

WINSTON A. DOUGLAS, *Examiner.*